United States Patent [19]

Komiya et al.

[11] Patent Number: 5,126,956
[45] Date of Patent: Jun. 30, 1992

[54] METHOD AND APPARATUS FOR DISPLAYING SEGMENTS OF A LADDER DIAGRAM WHICH TURN ON AN OPERATOR SPECIFIED RELAY

[75] Inventors: Hidetsugu Komiya, Hino; Shinichi Isobe, Yamanashi, both of Japan

[73] Assignee: Fanuc Ltd, Minamitsuru, Japan

[21] Appl. No.: 398,398

[22] Filed: Aug. 25, 1989

Related U.S. Application Data

[63] Continuation-in-part of Ser. No. 797,783, Nov. 13, 1985, abandoned, which is a continuation of Ser. No. 474,341, Mar. 11, 1983, abandoned.

[51] Int. Cl.⁵ .............................. G06F 9/00; G06F 3/14
[52] U.S. Cl. ............................. 364/474.22; 364/146; 364/147
[58] Field of Search ............... 364/146, 147, 136, 474, 364/900 MS File

[56] References Cited

U.S. PATENT DOCUMENTS

| | | | |
|---|---|---|---|
| 3,944,984 | 3/1976 | Morley et al. | 364/900 |
| 3,964,026 | 6/1976 | Yamauchi et al. | 364/900 |
| 4,038,533 | 7/1977 | Dummermuth et al. | 364/136 |
| 4,244,034 | 1/1981 | Cherba | 364/900 |
| 4,385,367 | 5/1983 | Nakao et al. | 364/900 |
| 4,415,965 | 11/1983 | Imazeki et al. | 364/136 |
| 4,425,630 | 1/1984 | Yomogida et al. | 364/900 |
| 4,441,161 | 4/1984 | Sasaki et al. | 364/900 |
| 4,445,169 | 4/1984 | Wakita et al. | 364/147 |
| 4,991,076 | 2/1991 | Zifferer et al. | 364/137 |
| 4,994,957 | 2/1991 | Komiya et al. | 364/147 |

OTHER PUBLICATIONS

European Search Report for EP 89194, Search Report published Oct. 9, 1985, based on application No. 83301349 filed Mar. 11, 1983.
"Logitrol 500" Programming Manual, General Electric Co., Bloomington, Ill. Jan. 1977, pp. 1-30.

*Primary Examiner*—Dale M. Shaw
*Assistant Examiner*—A. Bodendorf
*Attorney, Agent, or Firm*—Staas & Halsey

[57] ABSTRACT

An apparatus for displaying a ladder diagram in a numerical control system having a programmable sequence control function in which sequence processing is executed based on a sequence program to deliver commands from a numerical control device to a machine and signals from the machine to the numerical control device. A display unit displays the sequence program in the form of a ladder diagram made up of relays. The pictures of ladder diagrams in the sequence program which are displayed on a screen are generated by pattern and character information stored in a character generator. The identification of a relay of interest or the memory address storing the state of the relay is entered, an item of sequence data indicating the conditions which turn the relay on are selected, and a ladder diagram segments indicative of the conditions are displayed on the basis of the sequence data.

11 Claims, 8 Drawing Sheets

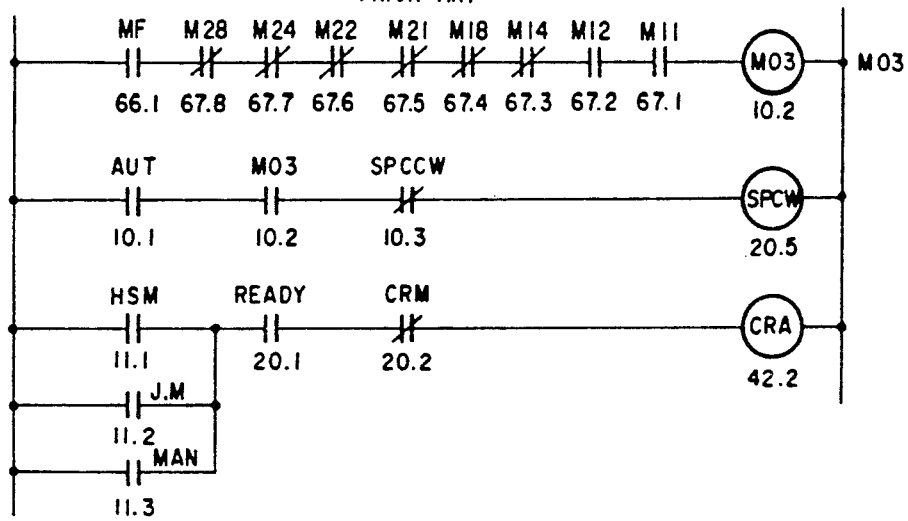

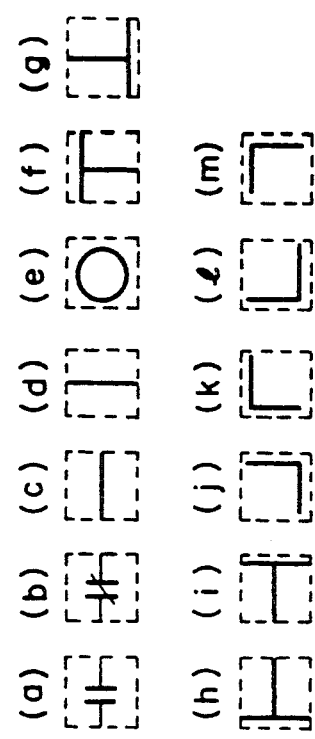
Fig. 9
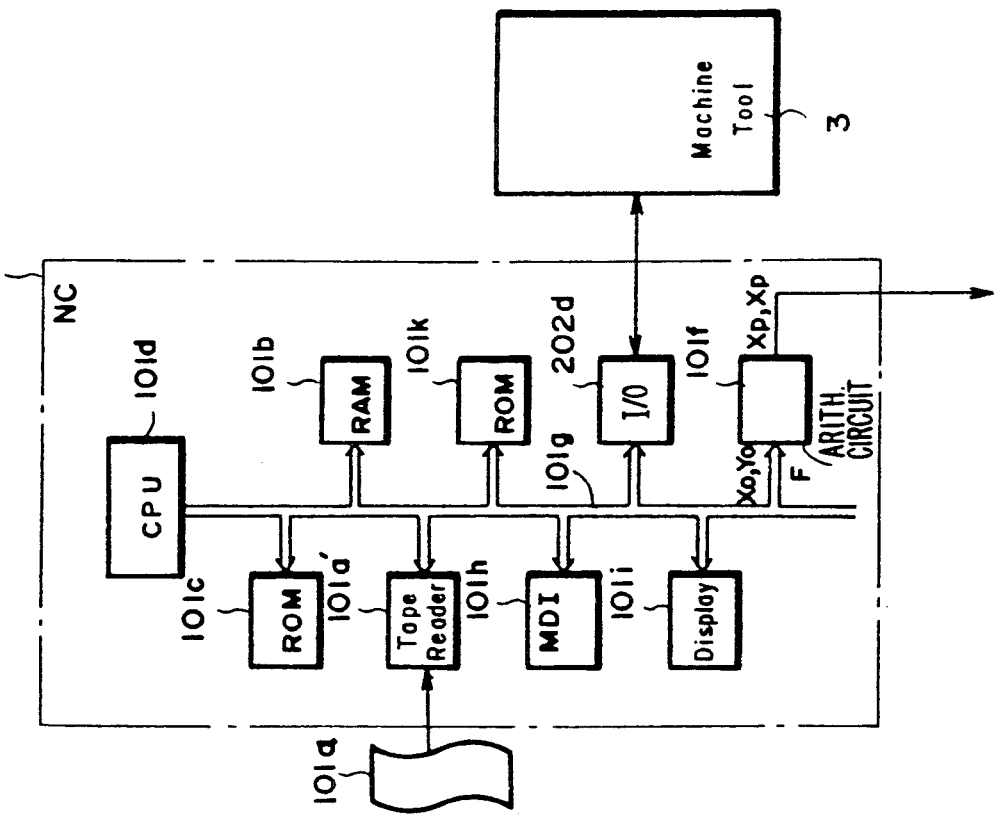
Fig. 10
Fig. 7

METHOD AND APPARATUS FOR DISPLAYING SEGMENTS OF A LADDER DIAGRAM WHICH TURN ON AN OPERATOR SPECIFIED RELAY

CROSS REFERENCE TO RELATED APPLICATIONS

This is a continuation-in-part of U.S. application Ser. No. 06/797,783 filed Nov. 13, 1985 now abandoned which is a continuation of application Ser. No. 06/474,341 filed Mar. 11, 1983 now abandoned. This application is related to U.S. application Ser. No. 07/041,618 now issued as U.S. Pat. No. 4,994,957.

BACKGROUND OF THE INVENTION

This invention relates to a method and apparatus for displaying a ladder diagram. More particularly, the invention relates to a method and apparatus well-suited for displaying ladder diagrams indicative of sequence control performed by a programmable sequence controller.

Numerical control systems permit various mechanical elements in machine tools to be controlled on the basis of commands issued by a numerical control device which incorporates an operator's panel. In such numerical control systems a hardwired switch network or so-called "magnetics" unit comprising a multiplicity of relays is connected between the numerical control device, commonly referred to as an NC device, and the machine tool. Prescribed ones of these relays are actuated in response to the commands issued by the NC device, whereby the prescribed elements of the machine tool are caused to operate in the manner specified by the commands. These commands may be entered directly from the operator's panel, or may be generated in response to programmed M-function and S-function instructions. Disadvantages encountered in the conventional systems of the above type are the large size of the apparatus and the high cost entailed by the large number of relays, as well as poor reliability attributed to mechanical failure of the relays.

In view of the foregoing disadvantages, sequence controllers, also known as programmable sequence controllers, are now the most widely used means for performing, through program processing, the function of the magnetics unit A programmable sequence controller (referred to hereinafter as a PSC) according to the prior art is illustrated in FIG. 1. A numerical control device 1 is separate from the conventional PSC 2 installed in a machine tool. The numerical control device 1 includes a paper tape 101a bearing machining commands in punched form, a paper tape reader 101a' for reading the paper tape, a random access memory (RAM) 101b for storing the machining commands read in from the paper tape 101a, a read-only memory (ROM) 101c storing a control program for controlling the numerical control device 1, a central processing unit (CPU) 101d for executing processing in accordance with a machining command program or a control program, a transceiver unit 101e, such as a direct memory access controller (DMAC), for the purpose of sending data to and receiving data from the sequence controller 2, and an arithmetic circuit 101f comprising a so-called pulse distributing circuit which receives as inputs thereto signals indicative of amounts of movement $X_o$, $Y_o$ along the X and Y axes, respectively, and a signal indicative of feed speed F, for producing distributed pulses $X_p$, $Y_p$ by performing a well-known arithmetic pulse distribution operation based on these signal inputs. The numerical control device 1 also includes a manual data input unit (MDI) 101h that is mounted on the operator's panel of the numerical control device 1 for entering single blocks of machining command data when, say, adding to or modifying such data. Also provided is a universal display unit 101i for displaying, e.g., the present position of a tool or the like Note that the display unit 101i and MDI 101h may be constructed as a single unit. The above-mentioned units are interconnected by a bus line 101g.

The PSC 2 comprises a programmer 201 for converting an entered sequence program into machine language and for correcting the sequence program, and a sequence controller cabinet 202. The programmer 201 includes a paper tape 201a bearing a correspondence table (described below) and a sequence program in punched form, a paper tape reader 201b for reading the paper tape 201a, and a random access memory (RAM) 201c for storing the sequence program. A sequence program performs the function of a magnetics unit, expressing the function thereof in logical form using operation codes and operands which make up a program. By way of example, a ladder diagram for part of the magnetics unit shown in FIG. 2 may be programmed as depicted in FIG. 3. In FIG. 3, the operation codes in the sequence program are given by RD, AND, WRT, OR, AND NOT and so on. RD is a read operation instruction, AND a logical product instruction, WRT a write operation instruction, OR a logical sum instruction, and AND NOT an instruction for logical multiplication with a negated value. Further, MF, M28, . . . , AUT, MO3 . . . represent the operands of the sequence program and correspond to prescribed addresses and prescribed bits in a data memory 202a, described below, located within the sequence controller cabinet 202 The PSC 2, based on the group of instructions (1) shown in FIG. 3, executes the following logical operation:

MF $\overline{M28}$ $\overline{M24}$ $\overline{M22}$ $\overline{M21}$ $\overline{M18}$ $\overline{M14}$ $\overline{M12}$ $\overline{M11}$ and stores the result of the operation (either logical "1" or logical "0") in the data memory 202a at the prescribed bit of the prescribed address corresponding to operand MO3. The PSC 2 also executes the following logical operation based on the group of instructions (2):

AUT MO3 $\overline{SPCCW}$ and stores the result of the operation ("1" or "0") in the data memory 202a at the prescribed bit of the prescribed address designated by the operand SPCW Returning to FIG. 1, the programmer 201 further includes a correspondence table 201d for storing the corresponding relationships between the symbols MF, AUT . . . constituting the operands of the sequence program, and storage locations of the data memory 202a. An example of what is stored in the correspondence table is illustrated in FIG. 4. It will be seen that the symbol AUT corresponds to the first bit of the tenth address of the data memory 10, that symbol MO3 corresponds to the second bit of the tenth address, and likewise through symbol CRA, which corresponds to the second bit of the 42nd address. The ladder diagram of FIG. 2 also shows the symbols matched with the corresponding storage locations. The programmer 201 is also provided with a read-only memory (ROM) 201e for storing, e.g., a control program for controlling the overall programmer 201, as well as a language translator program for translating the sequence program read in from the paper tape 201a into machine language. The programmer 201 further comprises a central processing unit (CPU) 201f for executing, e.g., translation and correction of the sequence program in accordance with the program stored in the ROM 201e, and a transceiving unit 201g having a buffer or the like for sending data to and receiving data from the sequence controller cabinet 202. The foregoing units constituting the programmer 201 are interconnected by a bus line 201h.

The sequence controller cabinet 202 includes the data memory 202a mentioned above. The data memory 202a establishes correspondence between each relay of the magnetics unit shown in FIG. 2 and a single bit, the on/off (closed/open) state of a relay being represented by logical "1" or logical "0", respectively, in the corresponding bit. For example, assume that the operator places the system in the automatic mode using the operator's panel. With a magnetics unit, the relay AUT in the power sequence circuit would be placed in the ON state. With the PSC, however, logical "1" is stored in the first bit of the tenth address in data memory 202a. The sequence controller cabinet 202 also includes a transceiving unit 202b having a buffer or the like for supervising the transmission and reception of data with the programmer 201, a RAM 202c for storing the sequence program translated into machine language by the programmer 201, a data input/output unit 202d for supervising the transmission and reception of data with the machine tool 3, a ROM 202e for storing the control program which controls the overall sequence controller cabinet 202, a central processing unit 202f for executing prescribed sequence processing in accordance with the control program and sequence program, and a transceiving unit 202g for sending data to and receiving data from the numerical control device 1. The units constituting the sequence controller cabinet 202 are interconnected by a bus line 202h.

FIG. 5 is a block diagram showing the data input-/output unit 202d in greater detail. The data input/output unit 202d comprises a data input circuit DI and a data output circuit DO. The data input circuit DI includes receivers $R_1$ through $R_n$ which receive signals from various limit switches and relay contacts $RC_1$ through $RC_n$ delivered from the machine side on cables $l_{11}$ through $l_{1n}$, AND gates $G_1$ through $G_n$ receiving the outputs of the respective receivers $R_1$ through $R_n$, and a decoder $DEC_1$ which decodes address signals received from an address bus ABUS to open predetermined ones of the AND gates, the AND gate output being sent out on the data bus DBUS. The data output circuit DO includes flip-flops (or latch circuits if desired) $L_1$ through $L_m$ for storing such signals as forward and reverse spindle rotation signals obtained from the machine tool 3, drivers $D_1$ through $D_m$ provided for corresponding ones of the flip-flops (flip-flop will be abbreviated FF hereinafter) $L_1$ through $L_m$ for delivering the output signals from the FFs to the machine tool 3 via cables $l_{21}$ through $l_{2m}$ to actuate the relays $Ry_1$ through $Ry_m$, and a decoder $DEC_2$ which decodes address signals received from the address bus ABUS to place predetermined ones of the FFs in a settable or resettable state, and which stores in predetermined FFs the data received from the data bus DBUS. In addition to the buses ABUS and DBUS, a control signal bus CBUS is provided for sending and receiving control signals. The above-mentioned cables $l_{11}$ through $l_{1n}$ and $l_{21}$ through $l_{2m}$ interconnect the data input/output unit 202d and the machine tool so that data may be sent and received between them.

The PSC 2 operates in the following manner. First, a table showing the correspondence between symbols and storage locations is prepared while referring to the ladder diagram (FIG. 2) of the magnetics circuit, and the table is punched in a paper tape. A sequence program also is prepared in the above-described manner using operation codes and symbols (operands) and is similarly punched into the paper tape 201a. Next, the punched paper tape 201a is read by the paper tape reader 201b to store the correspondence table in table 201d and the sequence program in the RAM 201c. When the foregoing has been accomplished the PSC 2 starts executing the language processing program stored in the ROM 201e, reads the instructions in the sequence program out of the RAM 201c in successive fashion and converts the operation codes and operands into machine language. The PSC uses the correspondence table to convert each operand into the machine word representing the prescribed address and bit of the data memory 202a. The sequence program converted into these machine words is transferred to and stored in the RAM 202c through the transceiver unit 201g of the programmer 201 and the transceiver unit 202b of the sequence controller cabinet 202. The programmable sequence controller 2 is now capable of executing sequence processing. Henceforth, in accordance with the control program, the CPU 202f reads the sequence program instructions successively out of the RAM 202c one instruction at a time, executes sequence processing from the first to the last instructions of the sequence program and then returns to the first instruction to repeat the cycle. Thus the PSC 2 steps through the sequence program in a repetitive fashion.

Now assume that a command such as the command M03 for forward spindle rotation is issued by the numerical control device 101. When this takes place, with reference to FIG. 4, logical "1" is written into the data memory 202a in the first bit of the 66th address where the M-function is to be stored, in the first bit of the 67th address where the M-code signal M11 is to be stored, and in the second bit of the 67th address where the M-code signal M12 is to be stored.

Since the central processing unit 202f is executing sequence processing by repeatedly stepping through the sequence program cyclically and reading out the instructions thereof in consecutive fashion, logical "1" will be stored in the fifth bit of the 20th address of data memory 202a when the groups of instructions (1) and (2) in the sequence program (FIG. 3) have been executed. Thereafter, the status (SPCW="1") of the fifth bit at the 20th address is stored in, say, FF $L_1$ of the data output circuit DO (FIG. 5) and delivered to the machine tool 3 through the driver $D_1$ and cable $l_{21}$. This item of data places the relay $R_1$ of the machine tool 3 in the ON state so that the spindle of the machine tool is rotated in the forward direction. Now assume that, say, the relay contact RCI on the machine tool side closes (i.e., assumes the ON state) during forward rotation of the spindle, thereby indicating completion of the rotation operation. As a result, a forward rotation end signal (logical "1") from the machine tool side, which signal is produced by closure of the relay contact $RC_1$, is stored in a prescribed bit of the data memory 202a (FIG. 1) through the cable $l_{11}$, receiver $R_1$, AND gate G and data bus DBUS. Sequence programming then continues and the numerical control device 1 is informed of completion of the forward rotation operation. This ends the sequence step for forward rotation of the spindle.

In the case described above the PSC 2 is provided with the programmer 201. An arrangement as shown in FIG. 6 is possible, however, in which the programmer 201 and transceiver unit 202b are deleted, a sequence program already converted into machine language is read in from the numerical control device 1 by reading means (such as the paper tape reader 101a') and is stored in the RAM 202c through the transceiver units 101e and 202g. In place of the RAM 202c, moreover, it is possible to use a ROM for storing a sequence program comprising machine language. Furthermore, while the numerical control device 1 and PSC 2 are shown as provided separately in FIGS. 1 and 6, these can be integrated into a single unit and share the same processor, as illustrated in FIG. 7. In FIG. 7, portions similar to those shown in FIG. 1 are designated by like reference characters. Numeral 101k denotes the above-mentioned ROM for storing the sequence program expressed in machine language.

The numerical control system having the construction shown in FIGS. 1, 6 and 7 is capable of displaying a ladder diagram on the universal display unit 101i in order to facilitate sequence program debugging and maintenance processing. When displaying a ladder diagram in accordance with the prior-art method, however, the diagram segments or "rungs" are displayed sequentially in the order in which the sequence program is written. Accordingly, in order to investigate why, say, a control relay or output relay does turn on (i.e., close) when checking sequence logic during debugging or when a failure has occurred, the first task the operator must undertake is to find the pertinent control relay or output relay in the ladder diagram, which generally is many pages long. The operator must then investigate the conditions under which the relay turns on. The latter step, however, similarly entails searching the ladder diagram for the relays involved in turning the above-mentioned relay on, where the ladder diagram covers a large number of pages as stated above. In other words, debugging or maintenance cannot be carried out with facility in accordance with the prior-art method, where the sequence program is displayed in accordance with the order in which it was originally written.

SUMMARY OF THE INVENTION

Accordingly, an object of the present invention is to provide a method and apparatus for displaying a ladder diagram, wherein debugging and maintenance are greatly facilitated.

Another object of the present invention is to provide a method and apparatus for displaying a ladder diagram, wherein entering the identification of a desired relay or a memory address storing the state of the relay generates a display which shows solely the segment of the ladder diagram indicating the conditions for turning the relay on.

It is an additional object of the present invention to provide a system for automatically displaying all program segments which include conditions for turning on a specific relay.

According to the present invention, these and other objects are attained by providing a method and apparatus for displaying a ladder diagram in a numerical control system having a programmable sequence control function in which sequence processing is executed based on a sequence program to deliver commands from a numerical control device to a machine and signals from the machine to the numerical control device. A display unit displays the sequence program in the form of a ladder diagram made up of at least relays. The identification of a relay of interest or the memory address storing the state of the relay is entered, an item of sequence data indicating the conditions which turn the relay on is selected, and ladder diagram segments indicative of the conditions are displayed on the basis of the sequence data.

BRIEF DESCRIPTION OF THE DRAWINGS

FIG. 2 shows a ladder diagram of the type associated with magnetics circuitry;

FIG. 3 illustrates an example of a sequence program;

FIG. 4 is a table showing the corresponding relationship between symbols and storage locations in a memory;

FIGS. 6 and 7 are block diagrams illustrating examples of numerical control systems which include a programmable sequence control function;

FIG. 9 is a sample of symbolic patterns stored in a character generator included in the system of FIG. 8;

FIG. 10 is an explanatory view showing an example of a display presented on the screen of a CRT included in the system of FIG. 8;

DESCRIPTION OF THE PREFERRED EMBODIMENTS

In accordance with the present invention, ladder diagram segments indicating the conditions which turn a relay on are displayed by (1) entering either the identification of a relay such as a control relay or output relay or a memory address storing the state of the relay through use of an input device such as an operator's panel or manual data input device (MDI), (2) selecting the item of sequence data which indicates the conditions for turning the relay on, using the relay identification or memory address, and (3) displaying the ladder diagram segments that are based on the item of sequence data selected.

Figure 1:
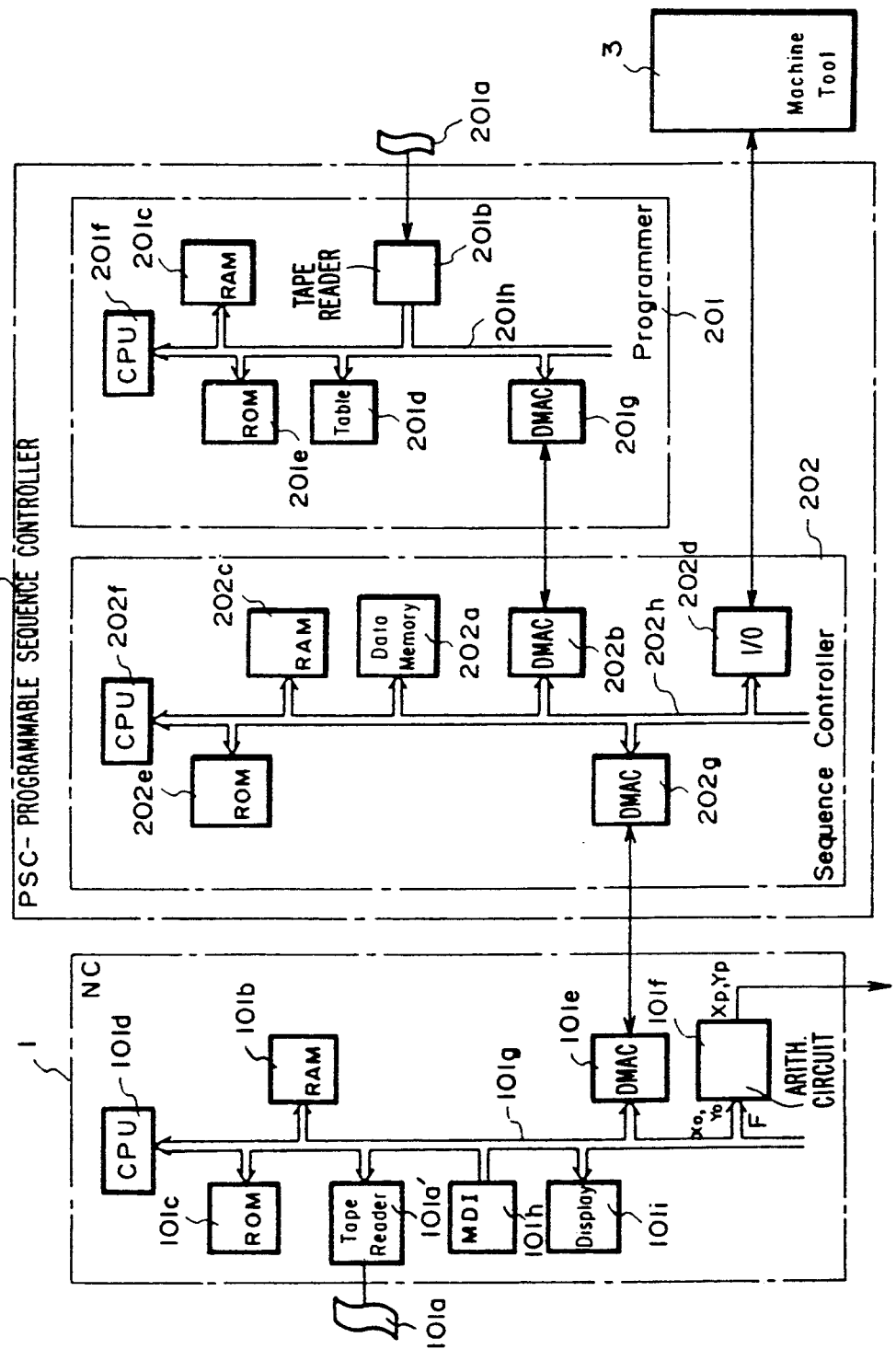
FIG. 1 is a block diagram of an example of a programmable sequence controller 2 according to the prior art.
Figure 5:
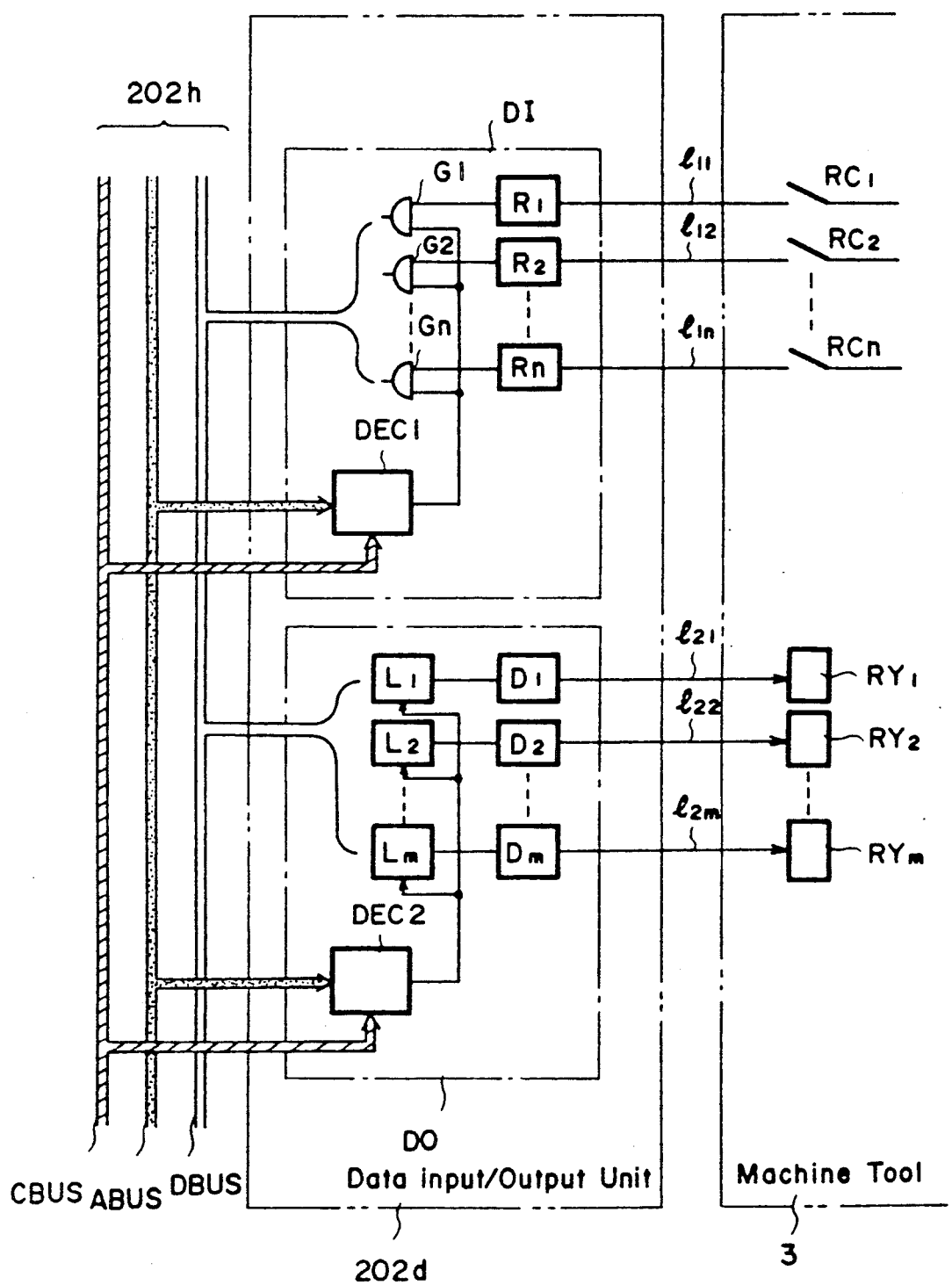
FIG. 5 is a block diagram of a data input/output unit included in the programmable sequence controller 2 shown in FIG. 1.
Figure 6:
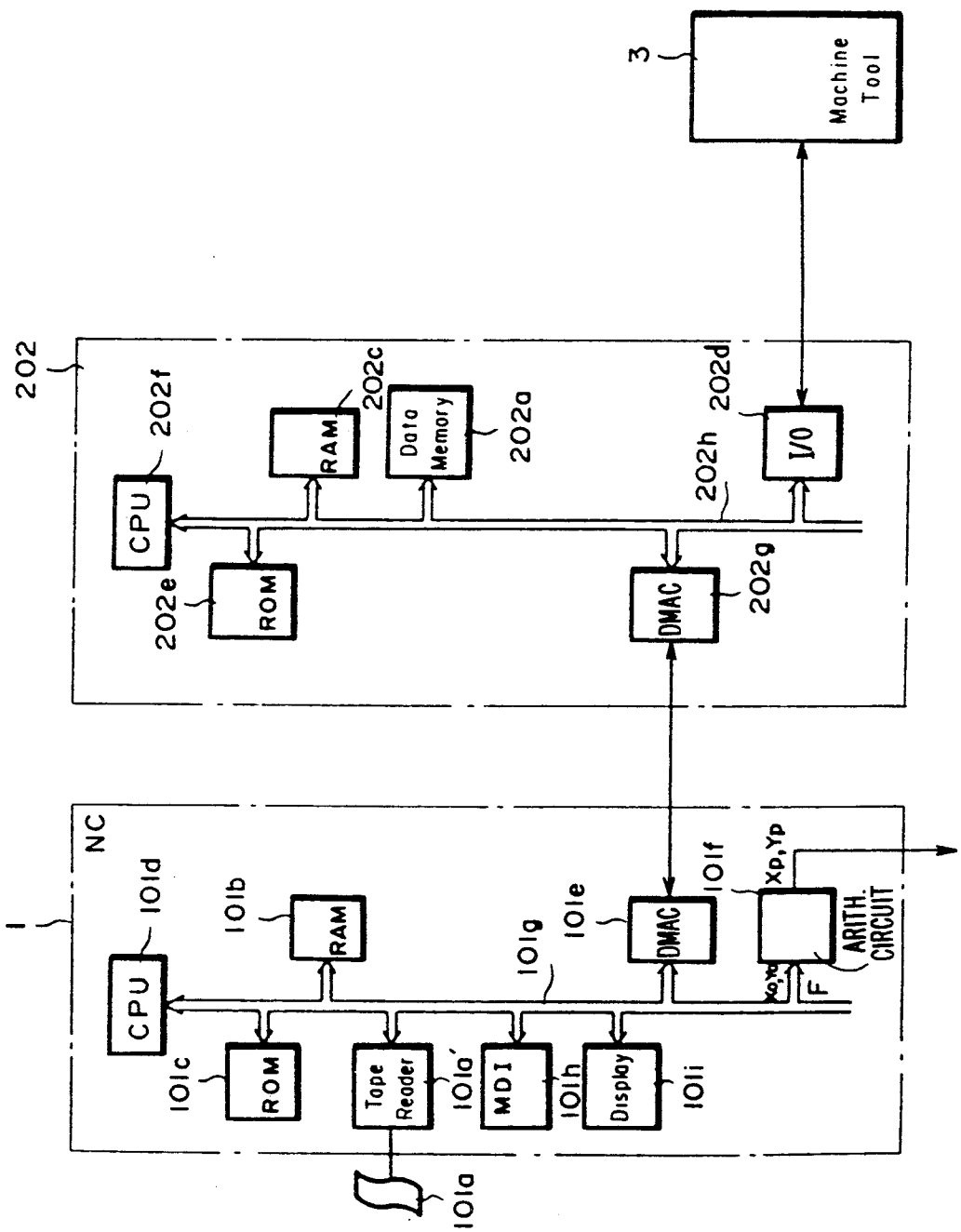
Figure 8:
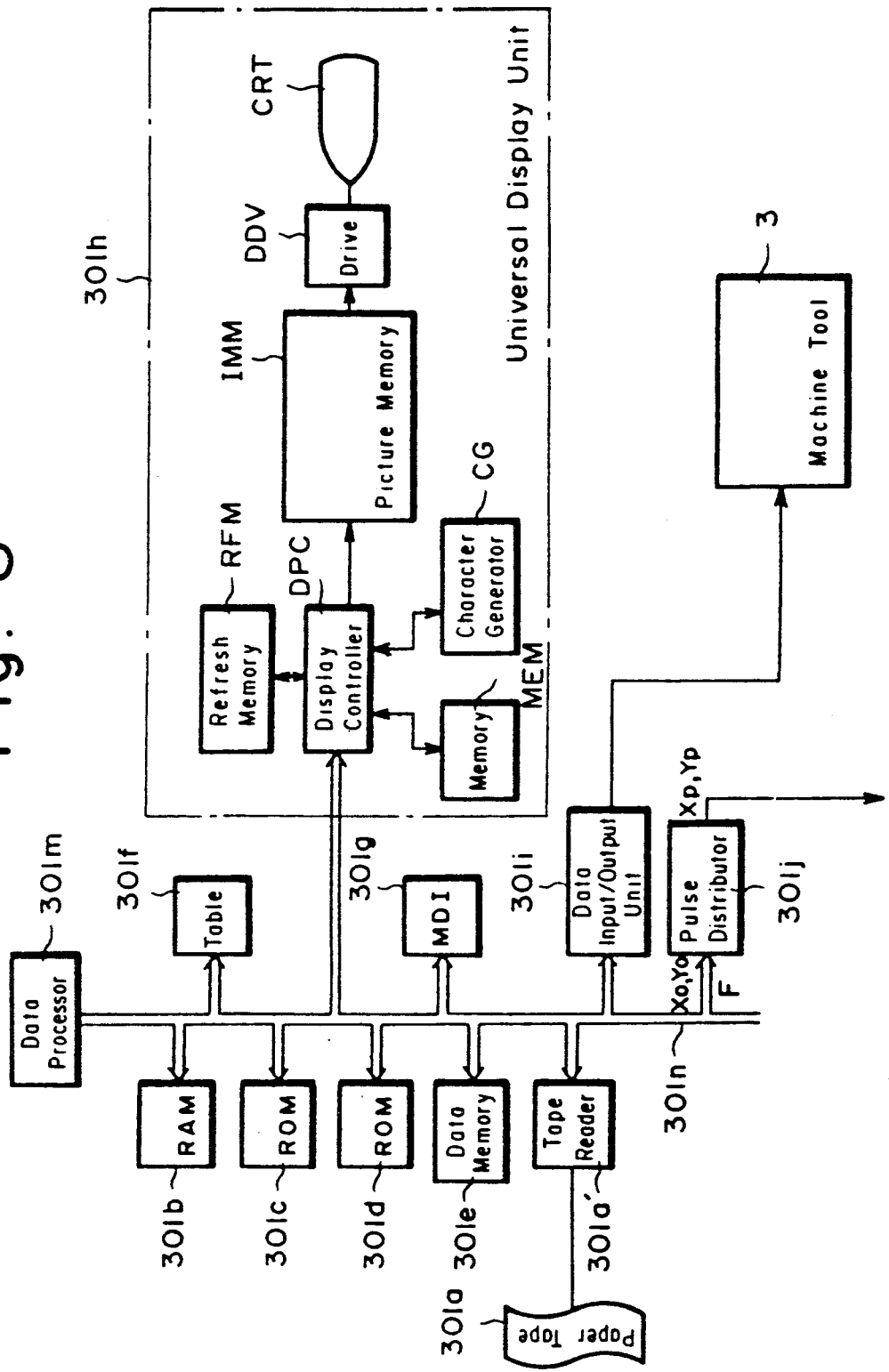
FIG. 8 is a block diagram of a numerical control system for practicing a ladder diagram display method according to an embodiment of the present invention.

Reference will now be had to FIG. 8 showing a block diagram of a numerical control system for practicing a method of displaying a ladder diagram according to the present invention. The system includes a numerical control tape 301a bearing machining commands in punched form, a tape reader 301a' for reading in the NC data from the tape 301a, a RAM 301b for storing the NC data read in by the tape reader 301a', a ROM 301c for storing a control program, a ROM 301d for storing a sequence program expressed in machine language, a data memory 301e comprising a RAM for storing the results of numerical control processing and of sequence processing, and a table 301f for storing the corresponding relationships between relay identifications written on a ladder diagram and locations (address and bit position) of the data memory 301e storing the logical state ("1" or "0") of the relays. Also included are a manual data input device (MDI) 301g, a universal display unit 301h, and a data input/output unit 301i for supervising the input and output of data with the machine tool 3 It should be noted that the data input/output unit 301i is structurally similar to the data input/output unit 202d shown in FIG. 5 Further provided is a pulse distributor 301j which receives as inputs thereto signals indicative of amounts of movement $X_o$, $Y_o$ along the X and Y axes, respectively, and a signal indicative of feed speed F, for producing distributed pulses $X_p$, $Y_p$ by performing a well-known arithmetic pulse distribution operation based on these signal inputs. All of the foregoing units are under the control of a data processing unit 301m, and all units are interconnected by a bus line 301n.

The universal display unit 301h comprises a display controller DPC, a refresh memory RFM connected to the display controller DPC for storing the sequence program data transferred from the ROM 301d following its conversion into picture information by the display controller DPC, a memory MEM for storing the corresponding relationships transferred from the table 301f, a character generator CG for storing various alphanumeric characters and symbolic patterns illustrative of a ladder diagram, a picture memory IMM for successively storing items of picture data generated by the character generator CG based on the picture information, whereby all picture information for displaying a single frame is stored, and a drive DDV which receives the picture information output of the picture memory IMM for driving a cathode ray tube CRT on the basis of the received information, whereby the CRT will display the stored picture.

As mentioned above, the character generator CG stores not only alphanumeric patterns but also symbols for displaying ladder diagrams Examples of these symbols are as shown in FIG. 9, in which (a) is a symbol indicating a normally open relay contact, (b) a symbol indicating a normally closed relay contact, and so on through (m) FIG. 10 is an enlarged view of a segment of a ladder diagram when displayed on the screen of the cathode ray tube CRT.

When a request for display of a ladder diagram is entered by an input device such as the operator's panel (not shown) or manual input device 301g, the data processing unit 301m transfers the corresponding relationships from table 301f to the memory MEM of the universal display unit 301h and then sends the sequence program data from the ROM 301d to the display side in sequential fashion. The unit of data delivered at one time comprises, say, the operation codes RD through WRT, as illustrated in FIG. 3. Upon receiving the sequence program data from the ROM 301d, the display controller DPC edits the data into picture information under the control of an editing program stored within the controller. For example, as shown in FIG. 10, the display controller DPC is adapted to divide one line into an identification display area, a symbolic display area and an address display area and to generate picture information for each display area so that one line of picture information will be made up of the picture information in the three display areas. The corresponding relationships stored in the memory MEM are used in generating the picture information for the identification display area. All picture information created by the display controller DPC is stored in the refresh memory RFM. Thereafter, the display controller DPC reads each item of picture information out of the refresh memory RFM in succession, reads the patterns corresponding to the picture information out of the character generator CG and stores the patterns in the picture memory IMM. Through these operations, ladder diagram segments are displayed sequentially on the CRT in accordance with the order in which the sequence program was written.

Figure 11:
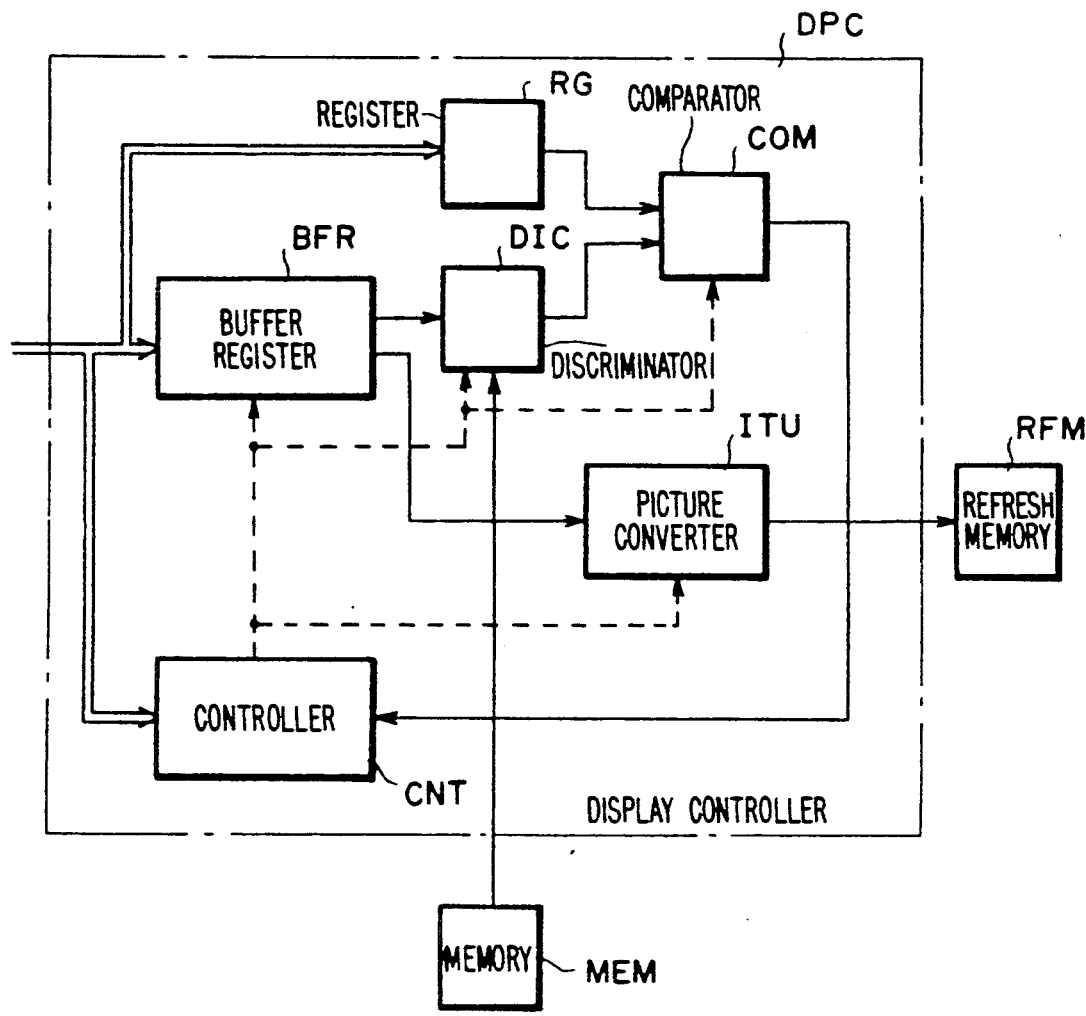
FIG. 11 is a block diagram illustrating a display controller included in the system of FIG. 8.

The foregoing description relates to a display operation for a case where the operator enters an ordinary request. Described next will be the processing which takes place in the display controller DPC shown in FIG. 11 when an operator wishes to selectively display only the segments constituting the ON conditions of a desired control relay or output relay. In the description, reference will be had to FIG. 11 showing a conceptual functional block diagram of the display controller DPC.

First, the operator goes to an input device such as the operator's panel or the manual data input device 301g and keys in the identification of the desired relay or the memory address at which the state of the desired relay is stored. The operator also designates, by a mode key, the ON conditions display mode for displaying a plurality of lines constituting the on conditions. We shall assume that the operator keys in "CRA" (FIG. 2) for the identification of the desired relay.

When signals indicative of the relay identification and ON conditions display mode enter the numerical control system, the data processor 301m delivers these signals to the universal display unit 301h and then sends the display unit the sequence program data starting from the beginning thereof. Within the display controller DPC, the relay identification "CRA" is stored in a register RG (FIG. 11), and the controller CNT is set in a mode for selectively displaying only segments which constitute the ON conditions of the relay signal identification "CRA". One unit of the sequence program data, extending from the operation code RD to the operation code WRT, is stored in a buffer register BFR instruction-by-instruction.

Figure 12:
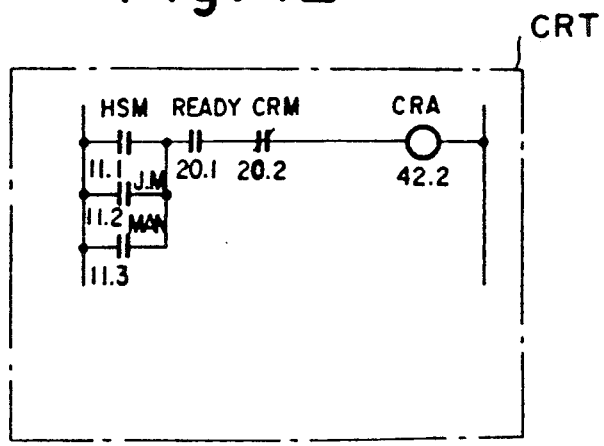
FIG. 12 is an explanatory view showing an example of a display presented on the screen of a CRT included in the system of FIG. 8.

When one input unit of the sequence program data enters the buffer BFR, a discriminator DIC discriminates the operation code WRT and goes to the memory MEM to read out the relay identification using, as a key, the address and bit position of the data memory corresponding to the programmed operand following the operation code WRT. The identification is delivered to a comparator COM. The latter compares the relay identification "CRA" with the relay identification output of the discriminator DIC and sends the result of the comparison, namely whether the two identifications do or do not agree, to the controller CNT. If the two do not agree, then the controller CNT requests a transfer of the next input unit of the sequence program data and the foregoing operations are repeated. If the two do agree, the controller CNT causes a picture converter ITU to convert the unit of sequence program data stored in the buffer register BFR into picture information, this information then being stored in the refresh memory RFM. Thus, picture information regarding the sequence program data which includes the entered relay signal identification "CRA" is stored in the refresh memory RFM. The character generator CG generates a picture based on the picture information stored in the refresh memory RFM and the picture is stored in the picture memory IMM and displayed on the cathode ray tube CRT. Thus, as shown in FIG. 12, the cathode ray tube will display only the ladder segments in which the relay identified by "CRA" is to be turned on.

At the same time, the addresses and bit positions of the data memory corresponding to the operands following operation codes other than WRT, namely RD, OR, AND, AND.NOT, which are contained in the sequence program data stored in the buffer register BFR, are stored in the register RG.

The controller CNT requests the data processor 301m to send the sequence program data again from the beginning.

When one input unit of sequence program data enters the buffer register BFR, the discriminator DSC discriminates the operation code WRT and provides the comparator COM with the address and bit position of the data memory corresponding to the programmed operator which follows the operation code WRT. The comparator COM subjects these data to a comparison between a plurality of addresses and bit positions (namely 11.1, 11.2, 11.3, 20 1, 20.2) of the data memory stored in the register RG, and sequentially applies the results of the comparison, which indicate whether there is agreement or nonagreement, to the controller CNT. When there is a non-agreement between address and bit position with regard to two items of data, the controller CNT requests transfer of the next input unit of sequence program data. If there is agreement between address and bit position for the two items of data, the sequence program data stored in the buffer register BFR are converted into picture information by the image converter ITU and the picture is stored in the refresh memory RFM. The items of sequence program data are transferred successively every input unit and the same processing is performed between these data and the data stored in the register RG. As a result, picture information regarding a plurality of lines (MAN, READY, CRM) constituting the ON conditions of the line which includes the desired relay signal identification "CRA" is stored in the refresh memory RFM.

Figure 13:
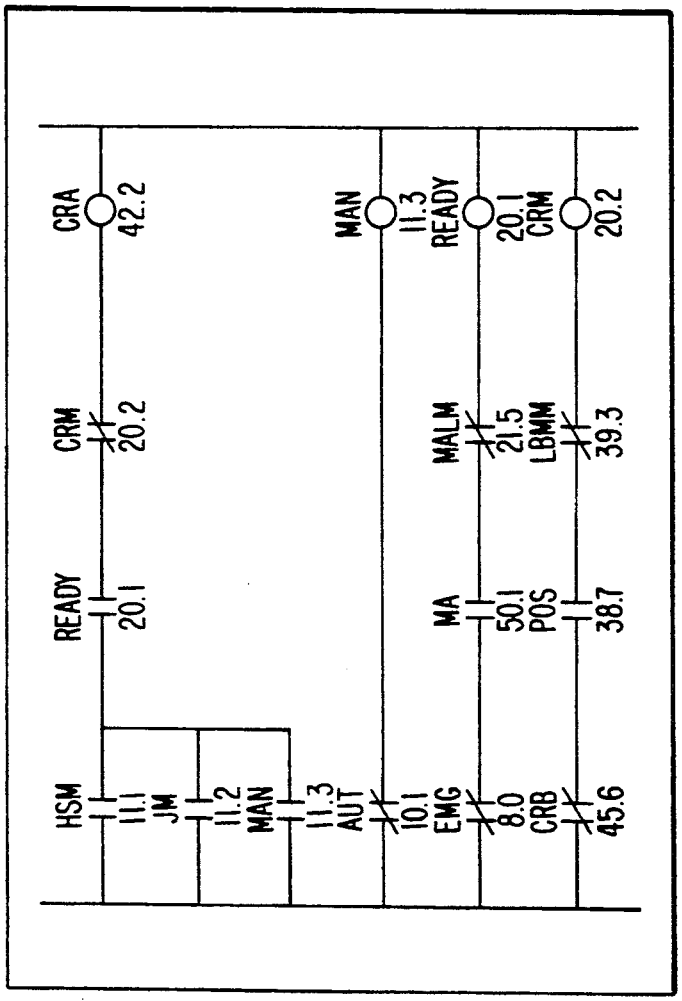
FIG. 13 depicts the display results of selecting a relay.

Accordingly, an image is generated by the character generator CG based on the picture information stored in the refresh memory RFM, this image is stored in the image memory IMM and is displayed on the CRT. When this is done, a ladder diagram which includes the contacts for turning on the specified relay "CRA" is displayed and, at the same time, so is a ladder diagram corresponding to all segments which include the relays for driving these contacts, as shown in FIG. 13. In FIG. 13, input signals, namely HSM and JM, which are directly incorporated in the ladder are not displayed as these do not correspond to relays.

In accordance with the display apparatus of the present invention, specifying a specific relay makes it possible to display, at one time in the form of a ladder diagram, only the conditions and all the relays for actuating the specified relay. Therefore, in terms of investigating logic written by means of a ladder, debugging and maintenance are greatly facilitated.

As many apparently widely different embodiments of the present invention can be made without departing from the spirit and scope thereof, it is to be understood that the invention is not limited to the specific embodiments thereof except as defined in the appended claims.

We claim:

1. A method of displaying a ladder diagram in a numerical control system having a programmable sequence control function in which sequence processing is executed based on a sequence program to deliver commands from numerical control means to a machine and signals from the machine to the numerical control means, the sequence program including segments and being displayed on a display unit, including memory means, in the form of a ladder diagram composed of relays and other elements, said method comprising the steps of:
   (a) entering data specifying a predetermined relay;
   (b) automatically retrieving all sequence program instructions corresponding to the segments indicating the conditions for turning on the relay specified by said data;
   (c) converting the retrieved sequence program instructions into picture information;
   (d) generating a picture of a ladder diagram based on the picture information with pattern and character information stored in the memory means;
   (e) storing the generated picture of the ladder diagram in the memory means; and
   (f) displaying simultaneously the picture of the ladder diagram on the display unit.

2. A method according to claim 1, wherein the data specifying said relay is a relay identification symbol.

3. A method according to claim 1, wherein the data specifying said relay is a memory address storing a logical state of said relay.

4. A method according to claim 1, wherein one unit of the sequence program instructions comprises at least one operational instruction and a write instruction for writing the result of an operation.

5. A method according to claim 2, wherein step (b) comprises retrieving a unit of sequence program instructions whenever a relay identification symbol, comprising an operand of a write instruction in the sequence program instructions, agrees with the relay specified by the entered data.

6. A method according to claim 1, further comprising the step of (g) displaying an address of an open and closed state of each element and an element identification character adjacent to each element.

7. An apparatus for displaying a ladder diagram in a numerical control system having a programmable sequence control function, in which sequence processing is executed based on a sequence program to deliver commands from a numerical control system to a machine and signals from the machine to the numerical control system, the sequence program having segments and being displayed on a display unit in the form of a ladder diagram composed of relays and other elements, said apparatus comprising:
   input means for entering data specifying a predetermined relay;
   comparison means for comparing the sequence program with the relay specified by the entered data;
   retrieval means for automatically retrieving all sequence program instructions corresponding to segments indicating the conditions for turning on the relay specified by said data in dependence on the comparison;
   converting means for converting into picture information, sequence program instructions retrieved by said retrieval means;
   character generating means for storing patterns and characters necessary to display a ladder diagram and for generating a picture of a ladder diagram based on the picture information received from said converting means;

picture memory means for storing the picture of the ladder diagram generated by said character generating means; and displaying means for simultaneously displaying the picture of the ladder diagram on the display unit.

8. An apparatus according to claim 7, wherein one of the sequence program instructions comprises an operational instruction and a write instruction for writing the result of an operation.

9. An apparatus according to claim 8, wherein said retrieval means includes comparison means for determining whether a relay identification symbol, comprising an operand or a write instruction in one unit of the sequence program instructions, agrees with the relay specified by the entered data.

10. An apparatus according to claim 8, wherein said retrieval means includes conversion means for converting into a relay identification symbol an operand of a write instruction in one unit of sequence program instructions.

11. An apparatus according to claim 8, wherein said display means displays an address of an open and closed state of each element and an element identification character adjacent to each element.

* * * * *